(12) United States Patent
Dubois

(10) Patent No.: US 8,324,309 B2
(45) Date of Patent: Dec. 4, 2012

(54) HIGH MELT FLOW BLOCK COPOLYMERS FOR NON-WOVEN ADHESIVES

(75) Inventor: Donn Dubois, Houston, TX (US)

(73) Assignee: Kraton Polymers US LLC, Houston, TX (US)

( * ) Notice: Subject to any disclaimer, the term of this patent is extended or adjusted under 35 U.S.C. 154(b) by 200 days.

(21) Appl. No.: 12/768,114

(22) Filed: Apr. 27, 2010

(65) Prior Publication Data

US 2011/0263782 A1 Oct. 27, 2011

(51) Int. Cl.
*C08L 53/00* (2006.01)
*C08L 9/06* (2006.01)
*C08F 293/00* (2006.01)

(52) U.S. Cl. ........ 524/505; 524/571; 524/575; 524/577; 525/88; 525/314; 525/901

(58) Field of Classification Search ................. 524/503, 524/505, 570, 571, 575, 577; 525/313, 314, 525/901, 326.1, 331.9, 332.9, 88
See application file for complete search history.

(56) References Cited

U.S. PATENT DOCUMENTS

| | | |
|---|---|---|
| 3,985,830 A | 10/1976 | Fetters et al. |
| 4,087,484 A | 5/1978 | Miki et al. |
| 4,391,949 A | 7/1983 | St. Clair |
| 4,444,955 A | 4/1984 | St. Clair |
| 4,939,207 A | 7/1990 | Fasulo et al. |
| 5,399,628 A | 3/1995 | Moczygemba et al. |
| 5,750,607 A * | 5/1998 | Gerard et al. ................. 524/271 |
| 6,197,889 B1 * | 3/2001 | Knoll et al. ................... 525/314 |
| 6,524,294 B1 | 2/2003 | Hilston et al. |
| 2005/0101730 A1 | 5/2005 | Baik et al. |
| 2005/0187343 A1 | 8/2005 | DuBois |
| 2006/0229391 A1 * | 10/2006 | Torii et al. ...................... 524/64 |
| 2008/0015306 A1 * | 1/2008 | Wright et al. ................. 524/572 |
| 2008/0081858 A1 | 4/2008 | Fasulo et al. |
| 2011/0104487 A1 * | 5/2011 | Schroeyers et al. ..... 428/355 BL |

FOREIGN PATENT DOCUMENTS

| | | |
|---|---|---|
| CA | 716645 | 8/1965 |
| EP | 0532831 A1 | 3/1993 |
| EP | 0802251 B1 | 10/1997 |
| WO | 9102039 A1 | 2/1991 |
| WO | 02057386 A2 | 7/2002 |

* cited by examiner

*Primary Examiner* — Irina S Zemel
*Assistant Examiner* — Jeffrey Lenihan
(74) *Attorney, Agent, or Firm* — Clements Bernard PLLC; Michael A. Masse

(57) ABSTRACT

The present invention provides a low viscosity block copolymer for non-wovens construction adhesives of the formula [A–(A/B)]nX, wherein A represents an aromatic vinyl compound and (A/B) represents a polymer block obtained by random copolymerization of a mixture of a aromatic vinyl compound and butadiene in a weight ratio in the range of from 2:98 to 30:70, wherein n is an integer in the range of from 1 to 5, and wherein X is the remainder of the coupling agent.

12 Claims, 1 Drawing Sheet

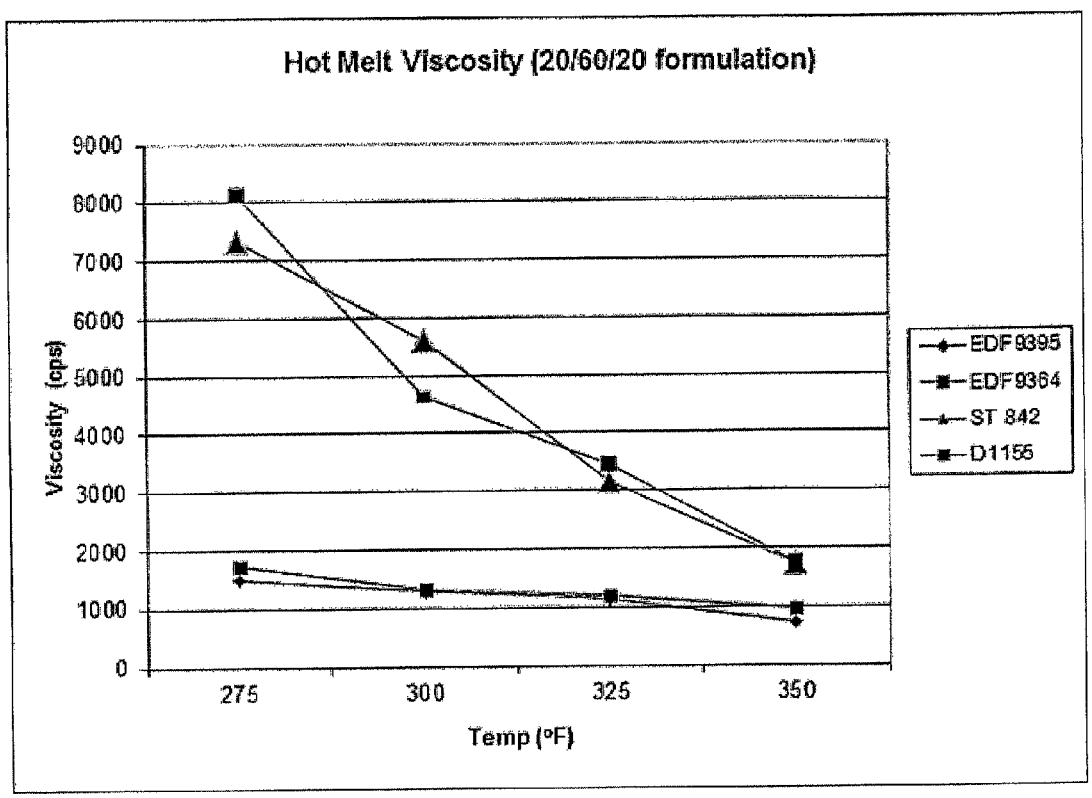

HIGH MELT FLOW BLOCK COPOLYMERS FOR NON-WOVEN ADHESIVES

FIELD OF THE INVENTION

The present invention relates to a high melt flow block copolymer for use in hot-melt adhesive compositions for non-wovens assembly adhesives. More particularly, the present invention relates to a high melt flow block copolymer for use in hot-melt adhesive compositions for the manufacture of sanitary articles such as infant and adult diapers, sanitary napkins, incontinent pads, bed pads, feminine pads, panty shields, and the like.

BACKGROUND OF THE INVENTION

It is generally known in the art, as taught in WO 9102039, EP 0532831A and EP 0802251 A, that block copolymers comprising terminal poly(styrene) blocks and one or more central poly(isoprene) blocks, more particularly triblock copolymers, are used in hot melt adhesive compositions for the manufacture of disposable articles. More specifically triblock copolymers having a poly(styrene) content of from 25 to 35 wt % and having a total apparent molecular weight of from 140,000 to 145,000 (e.g., KRATON® D-1165 block copolymer) are used in hot-melt adhesive compositions in the diaper industry in two manners:

1. as assembly adhesive to glue the diaper poly(ethylene) main frame and
2. as an attachment adhesive to glue the elastic attachments which are used as waist and leg bands.

Such adhesives must be lightly colored, transparent, low in odor, sprayable at 350° F., show good adhesion to poly(olefin) films and not strike through the non-woven back sheet. They must also be relatively inexpensive.

Elastic attachment adhesive is used to adhere elastic threads to polyethylene and non-woven films in order to form an elastic waist or leg band. Multiple strands of elastic threads are elongated, commonly 300%, and coated with adhesive composition at a temperature of about 300° F. just prior to being pinched inside of the poly(olefin) and non-woven webs. Like construction adhesives, they are usually sprayed in a spiral pattern. When the ends of the elastic are cut later in the process, the composite contracts causing the non-woven and poly(olefin) films to pucker to form an elastic band.

Although block copolymers such as KRATON D-1155 block copolymer show an acceptable hot-melt viscosity/temperature profile and have a sufficiently low viscosity at the usually applied hot-melt temperatures of up to 320° F. thereby enabling efficient processing, there is still an economic need for improved block copolymers which demonstrate improved processing efficiency, in combination with other attractive properties noted hereinbefore.

It will be appreciated that a relatively low hot-melt viscosity facilitates a high production speed in a diaper manufacturing line without the production of significant amounts of off spec product. Problems which normally cause such off spec product may be, for example, adhesive viscosity degradation, adhesive discoloration, damage to the polyethylene film or formation or char. Accordingly, developmental efforts in diaper manufacture continue today.

As a result of extensive research and experimentation it has now surprisingly been found that block copolymers comprising terminal, predominately poly(styrene) blocks and central (B/S) blocks, afford a good sprayable hot-melt viscosity at the temperatures preferably applied in the diaper industry, i.e. in the range of from about 250 to about 350° F. In addition, these block copolymers afford excellent color stability, superior adhesive performance and better viscosity stability compared to conventional adhesive compositions based on S-I-S block copolymer.

BRIEF SUMMARY OF THE INVENTION

A block copolymer used in non-woven assemblies includes a block copolymer of the formula [A–(A/B)]nX, wherein A represents an aromatic vinyl compound and (A/B) represents a polymer block obtained by random block copolymerization of a mixture of an aromatic vinyl compound and butadiene in a weight ratio in the range of from 2:98 to 30:70 wherein n is an integer in the range of from 1 to 5, and wherein X is the remainder of the coupling agent.

Each n in the above formulas is independently equal to or less than 5, preferably 2 to 3, even more preferably 3 to 4 and in all case there will be a mixture of n=1 (not coupled) and n greater than or equal to 2 for the expressed range of n values According to another embodiment of the present invention, a block copolymer used in non-woven assemblies includes the block (A/B) that has been obtained by random block copolymerization of a mixture of an aromatic vinyl compound and butadiene in a weight ratio of from 2:98 to 30:70.

According to yet another embodiment of the present invention, a block copolymer used in non-woven assemblies includes an (A/B) block that has a vinyl content in the polymerized butadiene in the range of from about 2 to about 15 wt %, including all points in-between.

According to yet another embodiment of the present invention, a block copolymer used in non-woven assemblies wherein A represents a predominately poly(styrene) block.

According to yet another embodiment of the present invention, a block copolymer used in non-woven assemblies wherein (S/B) represents a polymer block obtained by random block copolymerization of a mixture of predominately styrene and butadiene.

According to yet another embodiment of the present invention, a block copolymer used in non-woven assemblies includes from 0 to about 40 parts by weight of a plasticizer, including all points in-between.

According to yet another embodiment of the present invention, a block copolymer used in non-woven assemblies includes a coupling efficiency of from about 70 to about 98%, including all points in-between.

According to yet another embodiment of the present invention, a block copolymer used in non-woven assemblies includes a melt flow index of about 20 to about 60 (including all points in-between) measured at 200° C./5 kg ranging from 20 to 60 g/min.

According to yet another embodiment of the present invention, a block copolymer used in non-woven assemblies includes a block copolymer of the formula [S–(S/B)]nX, wherein S represents a predominately poly(styrene) block and (S/B) represents a polymer block obtained by random block copolymerization of a mixture of predominately styrene and butadiene in a weight ratio in the range of from 2:98 to 30:70 and a molecular weight from 20,000 to 150,000 g/mol, wherein n is an integer in the range of from 1 to 5, and wherein X is the remainder of the coupling agent According to yet another embodiment of the present invention, a block copolymer used in non-woven assemblies wherein the (S/B) block has a vinyl content in the polymerized butadiene in the range of from about 5 to about 15 wt %, including all points in-between.

According to yet another embodiment of the present invention, a block copolymer used in non-woven assemblies includes a block copolymer of the formula [S–(S/B)]nX wherein S represents a predominately poly(styrene) block and (S/B) represents a polymer block obtained by random block copolymerization of a mixture of predominately styrene and butadiene in a weight ratio in the range of from 2:98 to 30:70 and a molecular weight from 20,000 to 150,000 g/mol, wherein n is an integer in the range of from 2 to 5, and wherein X is the remainder of the coupling agent; b) a tackifying resin selected from C5/C9 hydrocarbon resins; and c) one or more plasticizers.

BRIEF DESCRIPTION OF THE DRAWINGS

The present invention is illustrated and described herein with reference to the various drawings, in which like reference numbers denote like method steps and/or system components, respectively, and in which:

FIG. 1 is a graph of viscosity vs. temperature of block copolymers of the present invention compared with industry benchmark block copolymers.

DETAILED DESCRIPTION OF THE INVENTION

Non-woven sheets have become thinner in recent years, thus requiring lower adhesive application temperatures to prevent damage to the non-woven sheets, commonly called "burn-through." In the present invention, an SBS block copolymer is disclosed that has improved mechanical properties and performance for use in the non-woven industry among other industries.

In one embodiment, the present invention provides a block copolymer used in non-woven assemblies that features the formula [A–(A/B)]nX, wherein A independently is a polymer block of an aromatic vinyl compound, and (A/B) represents a polymer block obtained by random anionic copolymerization of a mixture of aromatic vinyl compound and butadiene in a weight ratio in the range of from 2:98 to 30:70, wherein n is an integer in the range of from 1 to 5, and X is the remainder of the coupling agent. The block copolymer has a poly(styrene) end-block content of from about 30 to about 60 wt %., including all points in-between.

Component A can be selected from a great variety of block copolymers wherein the vinyl aromatic blocks are derived from styrene, alpha-methylstyrene, p-methylstyrene, o-methylstyrene, p-tert-butylstyrene, 2,4-dimethylstyrene, diphenylethylenes including stilbene, vinyl naphthalene, vinyltoluene (a mixture of meta- and para-isomers of methylstyrene), vinylxylene and mixtures thereof. Of these monomers, pure styrene or mixtures in which styrene is the main compound and minor amounts of one or more of the other hereinbefore mentioned comonomers are preferred. As used herein, the phrase "minor amounts" refers to amounts in the range of up to about 5 wt %, when present typically present in an amount from about 1 to about 5 wt %. While the present invention is limited to those vinyl aromatic blocks which contain a "minor amount" of one or more comonomers, those of ordinary skill in the art will recognize that in certain instances, it may be desirable to use mixtures in which the "minor amounts" are greater than 5 wt %.

The A blocks represent a vinyl aromatic content which is a weight ratio of the vinyl aromatic block to conjugated diene block of total block copolymer, in the range of from about 30 to about 60 wt %, preferably from about 30 to about 55 wt %, with the most preferred range being from about 35 to about 50 wt %, including all points in-between.

The block copolymers contain 1,2 vinyl bonds and/or 3,4 vinyl bonds in a proportion of at most 15 wt %, based on the weight of the conjugated diene. While the present invention is limited to block copolymers that contain 1,2-vinyl bonds and/or 3,4-bonds in proportion of at most 15 wt %, those of ordinary skill in the art will recognize that 1,2-vinyl bonds and/or 3,4-vinyl bonds in a proportion of greater than 15 wt % are possible.

The A blocks have a weight average molecular weight in the range of from about 2,500 to about 25,000, preferably from about 7,000 to about 25,000. More preferred block copolymers have a weight average molecular weight (Mw) ranging from about 100,000 to about 500,000, more preferably from about 150,000 to about 250,000, including all points in-between, as determined by High Performance Size Exclusion Chromatography (HPSEC) according to the method described in ASTM D-5296-97, said method incorporated herein by reference.

As used herein, the term "molecular weights" refers to polystyrene equivalent, or apparent, molecular weight in g/mol of the polymer or block of the block copolymer. The molecular weights referred to in this specification and claims can be measured with gel permeation chromatography (GPC) using polystyrene calibration standards, such as is done according to ASTM 3536. GPC is a well-known method wherein polymers are separated according to molecular size, the largest molecule eluting first. The chromatograph is calibrated using commercially available polystyrene molecular weight standards. The molecular weight of polymers measured using GPC so calibrated are styrene equivalent molecular weights, also referred to as apparent molecular weights. The styrene equivalent molecular weight may be converted to true molecular weight when the styrene content of the polymer and the vinyl content of the diene segments are known. The detector used is preferably a combination ultraviolet and refractive index detector.

The melt flow of the polymer is measured according ASTM D1238 at 200° C. and 5 kg weight. It is expressed in units of grams of polymer passing through a melt rheometer orifice in 10 minutes. The block copolymers of the present invention have a desirable high melt flow rate allowing for easy processing. In one embodiment, the block copolymers of the present invention have a melt flow rate between about 20 and about 60 preferably about 20 to 50 g/10 min, including all points in-between.

Polymers having mixed midblocks derived from an aromatic vinyl compound and butadiene, are defined as having average homopolymer block lengths of less than 100 monomer units, preferably less than 50 monomer units, and more preferably less than 20 monomer units. Average homopolymer block length is determined by the method, based carbon-13 NMR, as described in detail in WO 02/057386, from page 12, line 14 to page 15, line 13, which is incorporated herein by reference.

Preparation of radial (branched) or linear coupled polymers requires a post-polymerization step called "coupling". In the formula, [A–(A/B)]nX for the block copolymer, n is an integer of from 1 to about 30, preferably from about 1 to about 5, and X is the remnant or residue of a coupling agent. A variety of coupling agents are known in the art and include, for example, dihalo alkanes, silicon halides, siloxanes, multifunctional epoxides, silica compounds, esters of monohydric alcohols with carboxylic acids, (e.g. dimethyl adipate) and epoxidized oils. Star-shaped polymers are prepared with polyalkenyl coupling agents as disclosed in, for example, U.S. Pat. Nos. 3,985,830; 4,391,949; and 4,444,953; Canadian Patent Number 716,645. Suitable polyalkenyl coupling agents include divinylbenzene, and preferably m-divinylbenzene. Preferred are tetra-alkoxysilanes such as tetra-ethoxysilane (TEOS) and tetra-methoxysilane, alkyl-trialkoxysilanes such as methyl-trimethoxy silane (MTMS), aliphatic diesters such as dimethyl adipate and diethyl adipate, and diglycidyl aromatic epoxy compounds such as diglycidyl ethers deriving from the reaction of bis-phenol A and epichlorohydrin.

The block copolymers used in the present invention have a Coupling Efficiency ("CE") of about 50 to 100 percent, including all points in-between. Preferably, the block copolymers have a Coupling Efficiency of about 80 to about 100 percent. Coupling Efficiency is defined as the proportion of polymer chain ends which were living, P-Li, at the time the coupling agent was added that are linked via the residue of the coupling agent at the completion of the coupling reaction. In practice, HPSEC data is used to calculate the coupling efficiency for a polymer product. The CE is a ratio of HPSEC peak areas and is unitless.

Resins and Oils

Extending oils used to make articles of the present invention preferably are hydrocarbon oils. Preferred extending oils are the white mineral oils such as the DRAKEOL® oils sold by Penreco, Karns City, Pa., and the TUFFLO® oils sold by Citgo, Tulsa, Okla. Low aromatic content paraffinic/naphthenic process oils are also satisfactory, such as the CALSOL® oils sold by Calumet. Synthetic oils such as the poly-alpha-olefin oils, polypropylene oils, polybutene oils and the like are also suitable. Any extending oil that is compatible with the block copolymers of the present invention, liquid at ambient temperatures, and known to be useful to those of ordinary skill in the art of preparing the subject article can be used with the present invention.

Suitable tackifying resins, which can be successfully used as the sole tackifying component in the adhesive compositions of the present invention, show a differential scanning calorimetry (DSC) glass transition temperature Tg between 30 and 60° C. and a Ring and Ball softening point between 80 and 110° C. They can be selected from modified aliphatic hydrocarbon resins such as $C_5$/C9 aromatic modified hydrocarbon resins. Some examples of suitable tackifying resins include, but are not limited to, Piccotac 8095 from Eastman Chemical Company, Wingtack Extra for Cray Valley and Wingtack STS from Cray Valley.

Those of ordinary skill in the art will recognize that in some instances it might be possible to blend aromatic modified and non-aromatic modified resins to tackify the S/B midblock.

The adhesive composition according to the present invention preferably comprises from about 20 to about 30 parts by weight of block copolymer, including all points in-between. The resin in the formulation can range from about 40 to 70 parts, including all points in-between. There can also be a plasticizing oil used in the formulation that ranges from about 0 to 40 parts by weight, including all points in-between. A widely used or "typical" formulation would be 20 wt % block copolymer, 60 wt % resin and 20 wt % plasticizing oil.

Plasticizers

The adhesive compositions of the present invention may contain one or more plasticizers. Suitable plasticizers include predominantly plasticizing oils that are paraffinic or naphthenic in character (carbon aromatic distribution <5%, preferably <2%, more preferably 0% as determined according to DIN 51378) and a glass transition temperature lower than −55° C. as measured by Differential Scanning calorimetry. Products such as these are commercially available from the Royal Dutch/Shell Group of companies, and include SHELLFLEX®, CATENEX™, EDELEX™ and ONDINA® oils. Other plasticizing oils that may be used include KAYDOL® oil from Witco, TUFFLO® oils from Arco or NYPLAST® from NYNAS. Still other plasticizers that are suitable for the present invention include compatible liquid tackifying resins such as REGALREZ® R-1018 from Hercules Inc. or WINGTACK® 10 from Goodyear Tire and Rubber Company.

Still other plasticizers may also be added, such as olefin oligomers; low molecular weight polymers (<30,000g/mol) such as liquid polybutene, liquid polyisoprene block copolymers, liquid styrene/isoprene block copolymers or liquid hydrogenated styrene/conjugated diene block copolymers; vegetable oils and their derivatives; or paraffin and microcrystalline waxes.

The composition according to the present invention preferably comprises one or more plasticizers in a weight proportion of from about 5 to about 40 wt based on the total weight of the formulation Other rubber components may also be incorporated into the adhesive compositions according to the present invention. It is also known in the art that various other components can be added to modify the tack, the odor, and the color of the adhesives. Antioxidants and other stabilizing ingredients can also be added to protect the adhesive from degradation induced by heat, light and processing or during storage.

Several types of antioxidants can be used, either primary antioxidants such as hindered phenols or secondary antioxidants such as phosphite derivatives or blends thereof. Examples of commercially available antioxidants are IRGANOX® 565 from Ciba-Geigy (2.4-bis-(n-octylthio)-6-(4-hydroxy-3,5-di-tertiary-butyl anilino)-1,3,5-triazine), IRGANOX® 1010 from Ciba-Geigy (tetrakis-ethylene-(3,5-di-tertiary-butyl-4-hydroxy-hydrocinnamate)methane), IRGANOX® 1726 from Ciba-Geigy; IRGANOX® 1076 from Ciba-Geigy; ETHANOX® 330 from Albemare; IRGAFOS® 168 from Ciba-Geigy and POLYGARD® HR from Uniroyal (tris-(2,4-di-tertiary-butyl-phenyl)phosphite). Other antioxidants developed to protect the gelling of the polybutadiene segments can also be use, such as SUMILIZER® GS from Sumitomo (2[1-(2-hydroxy-3,5-di-terpentylphenypethyl)]-4,6-di-tert-pentyiphenylacrylate); SUMILIZER® T-PD from Sumitomo (pentaerythrythyltetrakis(3-dodecylthiopropionate)); or mixtures thereof.

Preparation of the Composition

No particular limitation is imposed on the preparation process of the adhesive compositions of the present invention. Therefore, there may be used any process such as a mechanically mixing process making use of rolls, a Banbury mixer or a Dalton kneader, a hot-melt process characterized in that heating and mixing are conducted by using a melting kettle equipped with a stirrer, like a high shear Z-blade mixer or a single- or twin-screw extruder, or a solvent process in which the compounding components are poured in a suitable solvent and stirred, thereby obtaining an intimate solution of the pressure sensitive adhesive composition.

Table 1 below summarizes the structural and rheological data for four samples.

TABLE 1

Summary of SBS polymer parameters for four samples constructed in accordance with the present invention.

| EDF # | EDF9364 | EDF9370 | EDF9395 | FW07-256 |
|---|---|---|---|---|
| Type | (S-S/B)x | (S-S/B)x | (S-S/B)x | (S-S/B)x |
| MW (true) Kg/mol | (10.2-21.4/2.9)2 | (9-17.3/2.4)2 | (8-19.7/2.7)2 | (9-23/5)2 |
| PSC/midblock | 39/12 | 43/12 | 39/12 | 38 |
| 1,2 BD content % wt | 9 | 9 | 9 | 9 |

TABLE 1-continued

Summary of SBS polymer parameters for four samples constructed in accordance with the present invention.

| EDF # | EDF9364 | EDF9370 | EDF9395 | FW07-256 |
|---|---|---|---|---|
| MFR@200 C./5 kg | 26.4 | 93.5 | 50.7 | 51.2 |
| Coupling Efficiency (%) | 90 | 89 | 85 | 84 |

The data in table shows that EDF9364, EDF9395, and FW07-256 have acceptable melt flow rates, but EDF9370 exhibited an unacceptably high of a melt flow rate.

Use of the Compositions

PSA compositions according to the present invention may be applied without using any solvent (e.g., hot-melt) or in the form of their solutions to a base material such as paper or a plastic film by means of a proper coater, thereby producing various kinds of pressure sensitive adhesive laminates, tapes or labels.

During label manufacture, a laminate of a face stock, pressure sensitive adhesive layer and a release liner are passed through an apparatus which converts the laminate into commercially useful labels and label stock. The process involves, among others, die-cutting and matrix stripping to leave labels on a release liner.

It will be appreciated that another aspect of the present invention is formed by tapes, labels or bandages obtained by application of the hereinbefore specified adhesive compositions of the present invention on a carrier.

The present invention will hereinafter be illustrated more specifically by the following examples, however without restricting the scope to these specific embodiments.

Test Methods

Standard peel, tack, cohesion and viscosity tests were carried out on these formulations as described in the Test method manual for Pressure Sensitive Tapes from the Pressure Sensitive Tape Council (PSTC), the standard FINAT test method for Pressure sensitive materials, the AFERA test methods for Pressure Sensitive Adhesive Tapes and the ASTM related methods. Different testing surfaces have been used in function of the application: chromed stainless steel plates (No. 304)("ss") as recommended by the FINAT and Kraft paper.

Peel Adhesion (PA) was determined by Pressure Sensitive Tape Council Method No. 1 and ASTM D3330-83. Large numbers indicate high strength when peeling a test tape from a steel substrate.

Holding Power (HP) is the time required to pull a standard area (2.5'1.3 cm) of tape from a standard test surface (steel=ss) under a standard load (1 kg, 2 or 5 kg), in shear at 2° (Pressure Sensitive Tape Council Method No. 7; ASTMD-3654-82). Long times indicate high adhesive strength. Results are expressed in hours (h) or minutes (min). The type of failure mode is expressed as adhesive failure (AF) or cohesive failure (CF). This test can be carried out at room temperature (about 23° C.) or at a more elevated temperature, depending on the test.

The SAFT (shear adhesion failure temperature) was measured by 2.5×2.5 cm Mylar to chromed ss plates with a 1 kg weight. The samples are placed in an oven and the temperature is raised by 22° C./minute. SAFT measures the temperature at which the lap shear assembly fails.

Polystyrene content was determined by 1H-NMR.

Ring and Ball softening point is a measure of the temperature at which a resin softens following the ASTM E-28 test method.

The specific ingredients for each adhesive composition and the test results are listed in table 1.

TABLE 2

Select adhesive properties and comparison to benchmark polymers

|  | A | B | C | D | E |
|---|---|---|---|---|---|
| EDF9395 | 20 |  |  |  |  |
| EDF9364 |  | 20 |  |  |  |
| FW07-256 |  |  | 20 |  |  |
| Stereon 842A |  |  |  | 20 |  |
| D1155 |  |  |  |  | 20 |
| Drakeol 34 | 20 | 20 | 20 | 20 | 20 |
| Wingtack ET | 60 | 60 | 60 | 60 | 60 |
| Irganox 1010 | 2 | 2 | 2 | 2 | 2 |
| Ring & Ball | 188° F. | 202° F. | Not measured | Not measured | Not measured |
| 180° Peel, pli | 2.84 | 2.99 | 2.2 | 3 | 2.9 |
| HP SS, min. | 486 | 601 | 510 | 500 | 455 |
| SAFT, ° C. | 61 | 60 | 58 | 60 | 58 |

The data in table 2 shows that the polymers as described herein can be effectively formulated to provide lower formulated viscosity yet maintain comparable adhesive properties with benchmark SBS block copolymers such as Kraton D1155 or Firestone Stereon 842A.

The tensile at break of the block copolymers of this invention (FW07-256 and EDF9395) are compared to benchmark polymers as shown in Table 3 and FIG. 1, respectively. The block copolymers of this invention compare favorably to comparative block copolymers that have significantly higher viscosities.

TABLE 3

Tensile at break data for select polymers

| Polymer | Tensile at Break (psi) (Solution cast films, average of 5 measurements) |
|---|---|
| FW07-256 | 1700 |
| EDF 9395 | 2100 |
| Stereon 842A | 1700 |
| Kraton D1155BT | 4000 |

FIG. 1 exemplifies the lower melt viscosities of the EDF9395 and EDF9364 block copolymers with respect to industry benchmark polymers ST842 and D1155.

It should be realized that Tables 1, 2, and 3, and FIG. 1 exemplify a block copolymer that has lower melt viscosity while still maintaining good adhesive and mechanical performance. The properties will be advantageous for use with hot melt adhesives compositions for the non-woven industry, among others.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A non-woven assembly adhesive comprising:
   from about 20 to about 30 wt. % of styrenic block copolymer,
   from about 40 to about 70 wt. % of tackifier resin, and
   from about 5 to about 40 wt. % of plasticizer, all based on 100 wt % of the non-woven assembly adhesive, said styrenic block copolymer having the formula of $(S–S/B)_nX$, wherein S represents a polymer block of styrene and S/B represents a polymer block obtained by random copolymerization of a mixture of styrene and butadiene in a weight ratio in the range of from 2:98 to 30:70, and said styrenic block copolymer has a total apparent molecular weight from 20,000 to 150,000 g/mol, wherein n is an integer in the range of from 1 to 5, wherein X is the remainder of the coupling agent; and said styrenic block copolymer has a melt flow rate ranging from 40 to about 60 g/min., at 200° C./5 kg;

said tackifier is selected from C5-C9 hydrocarbon resin; and said plasticizer is an oil compatible with said styrenic block copolymer and said tackifier resin.

2. The non-woven assembly adhesive of claim 1, wherein said styrenic block copolymer has a coupling efficiency of 70 to about 98%.

3. The non-woven assembly adhesive of claim 1, wherein said S/B block has a vinyl content in the range of about 7 to about 15 wt. %.

4. The non-woven assembly adhesive of claim 1, wherein said S/B has average homopolymer block lengths of less than 100 monomer units.

5. The non-woven assembly adhesive of claim 4, wherein said S/B has average homopolymer block lengths of less than 20 monomer units.

6. The non-woven assembly adhesive of claim 1, wherein said styrenic block copolymer comprises a polystyrene end-block content from about 30 to about 60 wt. %.

7. A non-woven assembly, comprising a non-woven layer and an adhesive secured thereto, said adhesive comprising
from about 20 to about 30 wt. % of styrenic block copolymer,
from about 40 to about 70 wt. % of tackifier resin, and
from about 5 to about 40 wt. % of plasticizer, all based on 100 wt % of the non-woven assembly adhesive, said styrenic block copolymer having the formula of $(S–S/B)_nX$, wherein S represents a polymer block of styrene and S/B represents a polymer block obtained by random copolymerization of a mixture of styrene and butadiene in a weight ratio in the range of from 2:98 to 30:70, and said styrenic block copolymer has a total apparent molecular weight from 20,000 to 150,000 g/mol, wherein n is an integer in the range of from 1 to 5, wherein X is the remainder of the coupling agent; and said styrenic block copolymer has a melt flow rate ranging from 40 to about 60 g/min., at 200° C./5 kg;

said tackifier is selected from C5-C9 hydrocarbon resin; and said plasticizer is an oil compatible with said styrenic block copolymer and said tackifier resin.

8. The non-woven assembly of claim 7, wherein said styrenic block copolymer has a coupling efficiency of 70 to about 98%.

9. The non-woven assembly of claim 7, wherein said S/B block has a vinyl content in the range of about 7 to about 15 wt. %.

10. The non-woven assembly of claim 7, wherein said assembly is a diaper, personal sanitary articles, or a bed pad.

11. The non-woven assembly of claim 7, wherein said styrenic block copolymer comprises a polystyrene end-block content from about 30 to about 60 wt. %.

12. The non-woven assembly of claim 7, wherein said S/B has average homopolymer block lengths of less than 100 monomer units.

\* \* \* \* \*